United States Patent [19]
Dähler et al.

[11] Patent Number: 5,870,297
[45] Date of Patent: Feb. 9, 1999

[54] DEVICE FOR COMPENSATING THE DC OFFSET OF A CONVERTER USING A CONTROLLER

[75] Inventors: Peter Dähler, Remigen; Osvin Gaupp, Baden, both of Switzerland

[73] Assignee: Asea Brown Boveri AG, Baden, Switzerland

[21] Appl. No.: 939,168

[22] Filed: Sep. 29, 1997

[30] Foreign Application Priority Data

Nov. 25, 1996 [DE] Germany ............... 196 48 696.3

[51] Int. Cl.[6] ................................................. H02M 7/48
[52] U.S. Cl. ........................................................ 363/95
[58] Field of Search ................... 363/95, 96, 97, 363/98

[56] References Cited

U.S. PATENT DOCUMENTS

| | | | |
|---|---|---|---|
| 4,124,885 | 11/1978 | Nordby | 363/98 |
| 4,307,441 | 12/1981 | Bello | 363/97 |
| 4,439,822 | 3/1984 | Cocconi | 363/56 |
| 4,521,671 | 6/1985 | Fronius | 363/95 |
| 4,521,672 | 6/1985 | Fronius | 363/95 |
| 4,729,082 | 3/1988 | Sato | 363/96 |
| 4,748,550 | 5/1988 | Okado | 363/98 |
| 4,800,477 | 1/1989 | Esposito | 363/98 |
| 4,803,611 | 2/1989 | Sashida et al. | 363/98 |
| 4,878,026 | 10/1989 | Moreau et al. | 363/97 |
| 4,939,633 | 7/1990 | Rhodes et al. | 363/98 |
| 4,994,950 | 2/1991 | Gritter | 363/98 |
| 5,012,400 | 4/1991 | Yasuda | 363/95 |
| 5,045,988 | 9/1991 | Gritter et al. | 363/98 |
| 5,105,352 | 4/1992 | Iwasa et al. | 363/98 |
| 5,177,428 | 1/1993 | Hirose et al. | 363/96 |
| 5,355,299 | 10/1994 | Carpita | 363/95 |
| 5,450,310 | 9/1995 | Kawakami | 363/96 |

FOREIGN PATENT DOCUMENTS

| | | | |
|---|---|---|---|
| 361389 | 8/1993 | European Pat. Off. | H02M 7/48 |
| 3900796A1 | 7/1990 | Germany | H02M 7/48 |
| 4013171C2 | 10/1990 | Germany | H02M 7/48 |
| 4408325C2 | 9/1995 | Germany | H02M 7/48 |
| 4413690A1 | 10/1995 | Germany | H02M 5/44 |

*Primary Examiner*—Jeffrey Sterrett
*Attorney, Agent, or Firm*—Burns, Doane, Swecker & Mathis, L.L.P.

[57] ABSTRACT

A method and a device for correcting the DC offset of a converter are specified. The invention is defined in that the output voltage of the converter on the AC voltage side is fed to an essentially passive low-pass filter which reduces the output voltage to a level which can be processed electronically. Connected downstream of the low-pass filter is a controller which controls the DC offset essentially to zero by delaying the switching commands. The low-pass filter and the controller are arranged at a high-voltage potential.

5 Claims, 2 Drawing Sheets

DEVICE FOR COMPENSATING THE DC OFFSET OF A CONVERTER USING A CONTROLLER

BACKGROUND OF THE INVENTION

1. Field of the Invention

The invention relates to the field of power electronics. It proceeds from a method and a device for correcting the DC offset of a converter in accordance with the preamble of the first claim.

2. Discussion of Background

In U converters, that is to say converters having a DC intermediate circuit, which feed a power transformer on the AC voltage side, problems arise with a DC voltage component (DC offset) attached to the AC voltage. Although, by comparison with the amplitude of the AC voltage (for example 7.5 kV) this DC offset is very small (for example a few volts or fractions thereof), this DC offset can bring the transformer to saturation. This substantially reduces the power to be transmitted, or can even render operation impossible. The following solutions have been proposed to date to reduce these influences:

On the one hand, structural measures are undertaken on the transformer. In particular, an air gap is provided, or induction measurement probes (for example Hall probes) are inserted into the transformer and the DC offset is corrected as well as possible. However, these measures are comparatively complicated and expensive and are capable of controlling the DC offset only to a certain minimum. The structural interventions on the transformer are attended by relatively large losses and noise emissions. These disadvantages are no longer acceptable, in particular for high-power transformers.

On the other hand, attempts have been made to measure and correct the DC offset by means of high-precision DC current transformers, which are therefore also expensive. However, this measure likewise produced only unsatisfactory correction, and the control was correspondingly complicated and expensive.

SUMMARY OF THE INVENTION

Accordingly, the object of this invention is to provide a device and a method for correcting the DC offset of a converter, which device or method is as simple as possible to construct, is robust in operation and, by comparison with the prior art, permits improved correction of the DC offset.

This object is achieved in the case of a device or of a method of the type mentioned at the beginning by means of the features of the first claim.

The essence of the invention is thus that the output voltage of the converter on the AC voltage side is fed to a low-pass filter which is essentially passive (that is to say, free from offset) and which reduces the alternating component of the output voltage to a level which can be processed electronically. Connected downstream of the low-pass filter is a controller which controls the DC offset essentially to zero by slightly delaying or shifting the corresponding switching commands. The low-pass filter is preferably designed as a combined passive and active filter. The use of a passive filter has, in particular, the advantage that no additional DC offset is added by the operational amplifiers. Since the electronic measuring and control circuit is at the power current potential of the converter, the output signal of the controller is preferably fed optically in digitized form to the driving circuit of the switches of the converter. The A/D converter is advantageously connected downstream of the controller so that a DC offset added by the A/D converter is also automatically corrected. The controller gain amounts to, for example, the range of 25–75 µs/V. The invention uses the fact that very favorable standard operational amplifiers with outstanding offset characteristics are presently available on the market.

Further exemplary embodiments follow from the corresponding dependent claims.

The method according to the invention, and the device according to the invention provide a converter output voltage which, in the ideal case, has no DC offset which disturbs the transformer. The solution according to the invention is substantially less expensive and more precise than the approaches to a solution in accordance with the prior art.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
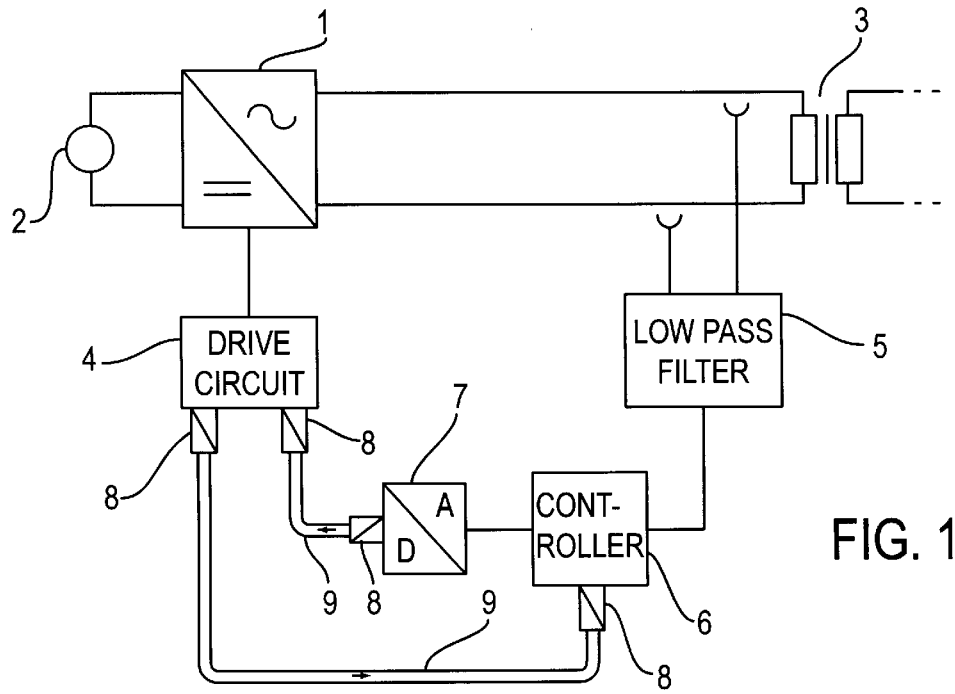
FIG. 1 shows a block diagram of the device according to the invention.

Referring now to the drawings, wherein like reference numerals designate identical or corresponding parts throughout the several views, FIG. 1 shows a block diagram with the aid of which the method according to the invention and the device according to the invention are to be explained. 1 denotes a converter which is connected to a DC voltage intermediate circuit 2, represented by a DC voltage source. A transformer 3 is provided on the AC voltage side. For its part, the transformer 3 is connected to a load (not represented), for example a drive motor or a power supply system or the like. The AC voltage generated by the converter 1 has an unavoidable DC voltage component (DC offset). When it becomes too large, this DC voltage component can bring the transformer 3 into saturation. Even if the DC offset when uncontrolled is very small by comparison with the AC voltage generated by the converter 1 (for example 10 mV DC/7.5 kV AC), it has a damaging influence on the transformer which is such as to call into question the ability of the entire circuit arrangement to function. It is therefore imperative to suppress the DC offset as effectively as possible.

This suppression is achieved according to the invention by firstly bringing the output voltage of the converter 1 on the AC voltage side to a level which can be processed electronically. For this purpose, a low-pass filter 5 is provided which strongly damps the measured output voltage above a specific cut-off frequency. Connected downstream of the low-pass filter 5 is a controller 6 which controls the output voltage of the low-pass filter 5 to zero. This is performed by virtue of the fact that the controller 6 is connected to the driving circuit 4 of the power semiconductor switches of the converter 1. The DC offset is corrected by delaying the commands for switching on and off in accordance with the voltage present at the controller 6. If, for example, a positive DC offset is measured, the switches for switching on the positive half wave are delayed until, as measured over one period, it is finally no longer possible to determine any DC offset. In the case of a negative DC offset, it is, of course, the commands for switching on the negative half wave which are delayed. Of course, instead of a delay, it is also possible for the respective other switches to be switched on prematurely, while those already conducting are switched off earlier. Of course, the same also holds for driving the switches by pulse-duration modulation. The controller gain is, for example, in the range of 25–75 μs/V, in particular approximately 50 μs/V. That is to say, a delay of approximately 50 μs is generated per 1 volt present at the controller output.

Figure 2:
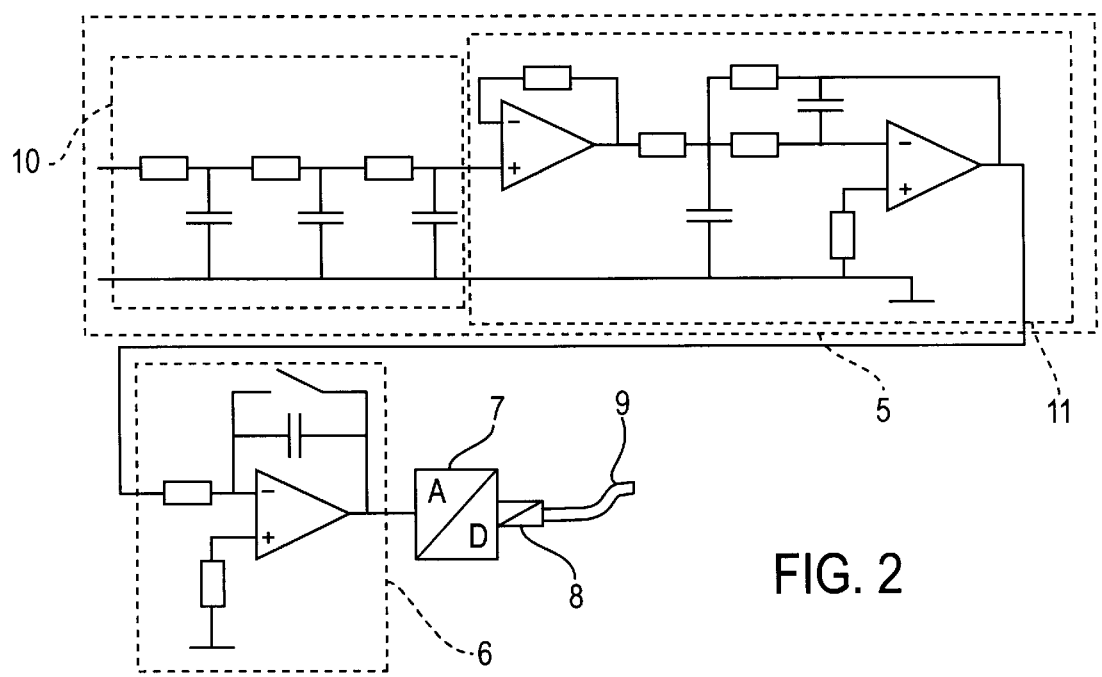
FIG. 2 shows a possible circuit arrangement for the low-pass filter and the controller.

In accordance with FIG. 2, the low-pass filter 5 preferably comprises a passive part 10 and an active part 11. The passive component filter 10 can be designed, for example, in the form of a three-stage cascade of RC elements. This is then a low-pass filter of third order. Passive filters have the advantage that no inherent DC offsets are added. Consequently, for the active component filter 11 use is advantageously made of an operational amplifier of low offset which also has a small temperature drift. Such modules are currently available on the market in a standard, low-cost design.

The same holds for the controller 6, which can be designed as a P controller, a PI controller or an I controller. An I controller is represented in FIG. 2. The controller 6 and the low-pass filter 5, as well as the A/D converter 7, are arranged together with the remaining measurement electronics at a high voltage potential. Consequently, offset errors caused subsequently no longer influence the DC voltage component of the output voltage of the converter 1 on the AC voltage side. In particular, the arrangement of the A/D converter 7 downstream of the controller 6 permits the influence of the A/D converter also to be automatically corrected. The switch assigned to the controller 6 serves to reset the integrator when the converter is not operating. It is driven in accordance with the driving circuit 4 via the optical fiber 9 leading to the controller 6.

Signals are preferably connected between the driving circuit 4 and the controller or the A/D converter 7 by means of optical fibers 9. The measurement electronics, that is to say the active filter 11, the controller 6, the A/D converter 7 and the optocouplers 8 can be provided with the required power either via an isolating transformer or by coupling out of the converter output voltage.

Figure 3:
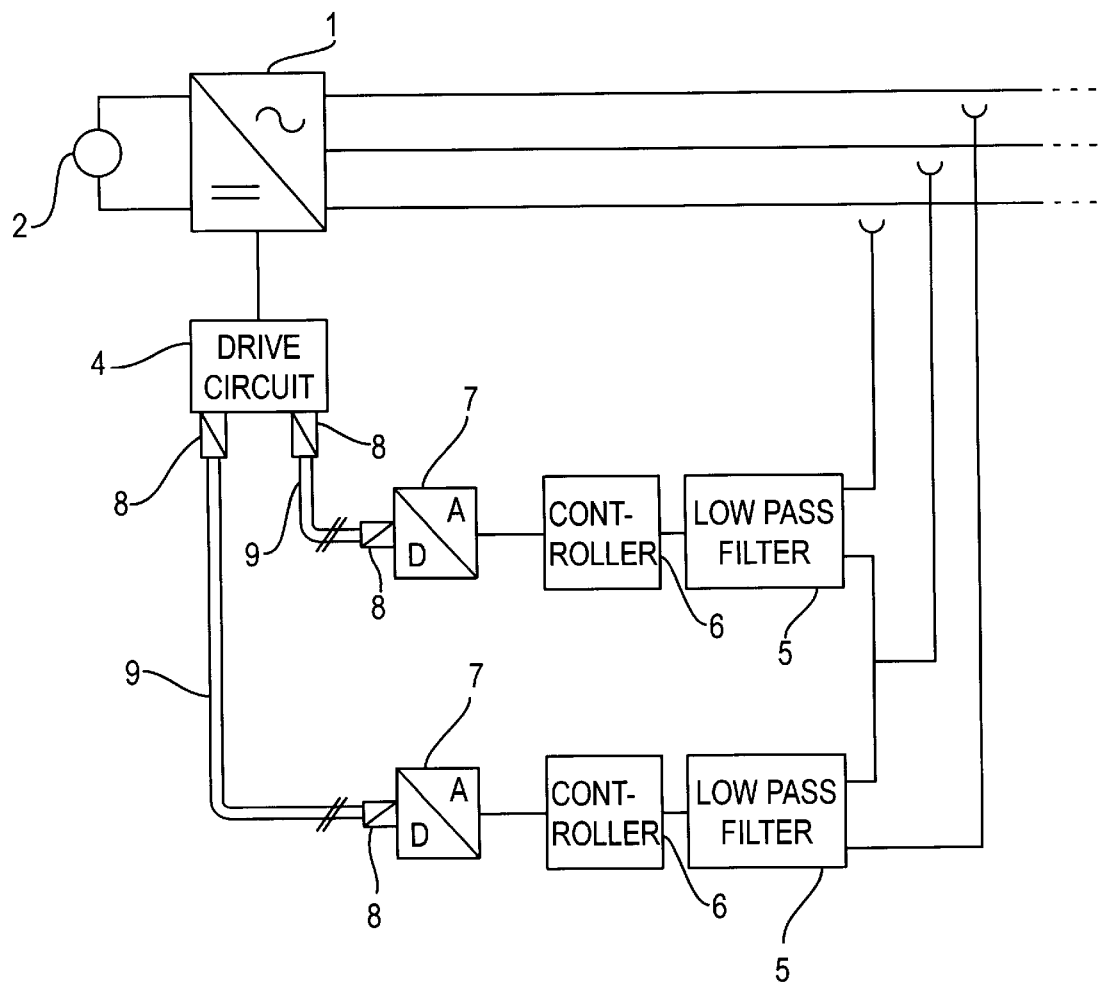
FIG. 3 shows a variant of the invention for 3-phase converters.

FIG. 3 shows a variant of the invention for three-phase converter circuit arrangements. In this case, two sets of filters 5, controllers 6 and A/D converters 7 are provided, which are connected in each case between two phases of the output of the converter 1 on the AC voltage side.

The invention can be used to reduce the DC component in a simple way to such an extent that the transformer 3 no longer exhibits disturbing saturation phenomena.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. A device for correcting the DC offset of a converter, having a DC intermediate circuit and a transformer on the AC voltage side, power semiconductor switches of the converter being switched on and off in accordance with switching commands of a driving circuit, wherein there is provided a low-pass filter having a passive part and an active part, for reducing an output voltage, on the AC voltage side, of the converter to a level which can be processed electronically, and wherein there is connected downstream of the low-pass filter a controller, including at least one of a proportional controller, an integral controller, and a proportional-integral controller, which is connected to the driving circuit and controls the DC offset essentially to zero by delaying or shifting the switching commands.

2. The device as claimed in claim 1, wherein an A/D converter is connected downstream of the controller, and the A/D converter is connected to the driving circuit via optocouplers and optical fibers.

3. The device as claimed in claim 1, wherein a cut-off frequency of the low-pass filter is substantially lower than the frequency of the output voltage of the converter on the AC voltage side.

4. The device as claimed in claim 1, wherein a control factor of the controller is in the range of 25–75 μs/V.

5. The device as claimed in claim 1, wherein a control factor of the controller is 50 μs/V.

* * * * *